March 25, 1952  R. E. KRUEGER  2,590,330
AIRCRAFT CABIN PRESSURE REGULATOR
Filed June 6, 1947  5 Sheets-Sheet 2

INVENTOR,
RUDOLPH E. KRUEGER
BY James M. Abbott
ATTORNEY

INVENTOR,
RUDOLPH E. KRUEGER
BY
ATTORNEY.

March 25, 1952

R. E. KRUEGER 2,590,330

AIRCRAFT CABIN PRESSURE REGULATOR

Filed June 6, 1947

INVENTOR,
RUDOLPH E. KRUEGER
BY
James M. Abbott
ATTORNEYS.

Patented Mar. 25, 1952

2,590,330

UNITED STATES PATENT OFFICE 2,590,330

AIRCRAFT CABIN PRESSURE REGULATOR

Rudolph E. Krueger, South Gate, Calif.

Application June 6, 1947, Serial No. 752,885

33 Claims. (Cl. 98—1.5)

This invention relates to a regulator for controlling the absolute pressure within a closed chamber so as to maintain therein higher pressures than the pressure of ambient atmosphere externally applied to the chamber, under conditions where said ambient pressure varies.

In many industrial applications it is necessary to employ a closed chamber or vessel which is to be subjected to varying external gas pressures and in which it is desired to control the gas pressure within the chamber in such a manner that the pressure differences between the interior and exterior of the chamber will follow a prescribed curve of relation, one to the other. One specific problem of this type is the control of pressurized airplane cabins for the purpose of permitting the passengers within the cabin to be subjected to a higer air pressure condition within the cabin than exists outside the cabin when the plane is flying. For such operation it is customary to construct an airplane cabin capable of sustaining a difference between the pressure inside and the pressure outside the cabin. However, it is well recognized that the limits imposed by economy of weight and structure of the cabin will not permit the cabin to be constructed to withstand excessive pressure differences. Hence, if the plane is to climb or to fly at an altitude at which critical pressure differences prevail it is necessary that the pressure in the cabin be reduced but it may be reduced on a pressure differential curve which corresponds to the pressure altitude curve but having the same pressure differential at all points along the curve.

Another object of my invention is to provide a pressure regulator valve of the character set forth, including isobaric and pressure differential sensing devices, wherein the valve may be employed to cause the pressure change within the chamber to follow a selected pressure differential schedule, the valve structure being ready for application to different types of chambers or different types of airplane cabins in which the structure of the chambers or cabins are designed to withstand different pressure differences between the interior and exterior of the chambers or cabins.

Another object of my invention is to provide a valve of the character set forth wherein the valve includes a main valve which intercommunicates with the interior and exterior of the chamber or cabin and which is actuated between its open and closed position by the pressure differences existing between the interior and exterior of the chamber or cabin.

It is another object of the present invention to provide a regulating valve which is powered by the pressure differential prevailing and without the application of external power.

Another object of my invention is to provide a valve of the character set forth in the preceding paragraphs wherein the actuation of the valve is caused by pilot valves controlled by flexible bellows subjected to particular air pressure conditions desired to be employed for the control of the main valve.

Another object of my invention is to provide an outlet valve structure having a valve diaphragm the outer surface of which is divided into a central area, against which ambient air pressure is constantly exerted, and a circumscribing annular area against which cabin air pressure is constantly exerted, and the inner surface of which is subjected over its entire area to a control pressure in a control chamber, which control pressure has a value intermediate said ambient and cabin air pressures; the contiguous edges of said outer surface areas being defined by members adapted to contact an outflow valve seat and to be held in spaced relation thereto by projecting elements carried upon said outer surface.

A further object is to provide such an outlet valve in which said circumscribing area is larger than said central area of the outer surface of the diaphragm, sufficiently so that said respective areas are of substantially equal pressure responsive effectiveness, whereby the pressure in said control chamber will be substantially the midpoint in the pressure drop from cabin to atmosphere through said control chamber.

The present invention contemplates the provision of an outflow valve structure operable in direct reference to the differences between air pressure within a closed chamber and air pressure exteriorly thereof as motivated by the pressure differential of cabin air and ambient atmosphere alone.

The invention is illustrated by way of example in the accompanying drawings, in which.

For purposes of more ready understanding of my invention, the following description will describe a form of structure which may be employed for the practice of my invention as particularly adapted for combat airplanes though it will be understood by those skilled in this art that the principles of my invention are equally adaptable to other industrial applications in which similar pressure change conditions are encountered and it is desired to control the difference in pressure between the interior and exterior of any closed chamber.

Figures 4, 8, 9:
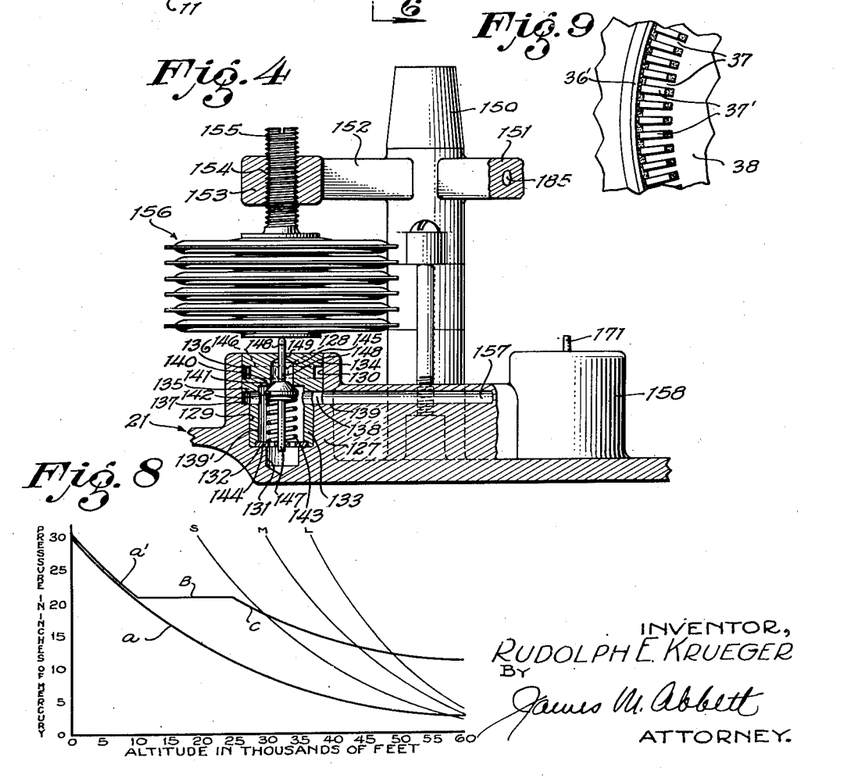
Fig. 4 is a view in vertical section and elevation showing the construction of the intermediate pilot valve and its isobaric control.
Fig. 8 is a view disclosing a performance graph for the valve herein disclosed.
Fig. 9 is a fragmentary view as seen on the line 9—9 of Fig. 3 and shows the serrated structure formed on the face of the main valve diaphragm.

To facilitate an understanding of the construction and operation of my pressure regulating valve, a particular example of pressure change conditions may be assumed, such as is illustrated in Fig. 8, wherein A represents the pressure-altitude curve between sea level and 60,000 feet altitude. In the example illustrated it is assumed that passenger comfort will not be seriously disturbed until the aircraft has reached an altitude of 10,000 feet and hence the pressure within the airplane cabin may, during the climb from sea level to 10,000 feet, be permitted to be equal to the air pressure existing externally of the cabin. As the plane climbs from 10,000 to 25,000 feet, the pressure within the cabin should be maintained at the same value as at the 10,000-foot level so that to all intents and purposes the passengers within the plane are still flying at a 10,000-foot pressure level when, as a matter of fact, the plane may have climbed to a height of 25,000 feet. Hence, as illustrated in Fig. 8, the curve or straight line B will represent the absolute pressure within the cabin during the climb from 10,000 to 25,000 feet.

Again it may be assumed that the structure of the cabin is such as will permit it to withstand pressure differences between the exterior and the interior of the cabin of, say, 2½ to 3 pounds per square inch, and it is therefore desirable that the pressure within the cabin should be reduced after the plane passes the 25,000-foot level to follow the curve C, it will be noted, parallels the curve A but is at a higher pressure level, that is, the curve C represents a constant pressure differential between the interior and exterior of the cabin.

On the chart, Fig. 8, additional curves S, M and L are illustrated as representing the maximum pressure-altitude curves to which a combat plane should be subjected when in the combat zone, that is, where there is a likelihood of the cabin becoming punctured with a resultant sudden decrease in the pressure within the cabin. The curve S represents the curve which should be followed for a small combat aircraft such as a fighter ship, while the curve M represents the curve which should be followed on a somewhat larger or medium-sized plane, and the curve L represents the curve which should be followed in a large combat ship, the difference between the several curves S, M and L conforming with the size of the various cabins and the rapidity with which pressure changes might occur in the event the cabins are punctured.

In the following description of the pressure regulator valve embodying the present invention, it will be pointed out specifically how each of the different pressure or pressure differential curves may be attained by the use of a simple compact pressure regulator valve which will be subjected to three different controls, one to cause the pressure within the cabin to follow the curve A to some predetermined air pressure level and then to follow along the curve B until a predetermined pressure difference exists between the exterior and interior of the cabin, a second control then being brought into action to cause the pressure within the cabin to follow the curve C, while a still further control is imposed upon the pressure regulator valve to cause the pressure within the cabin to follow the curves S, M and L, respectively, dependent upon the adjustment of this third control adapting it for a particular size of cabin.

Figure 3:
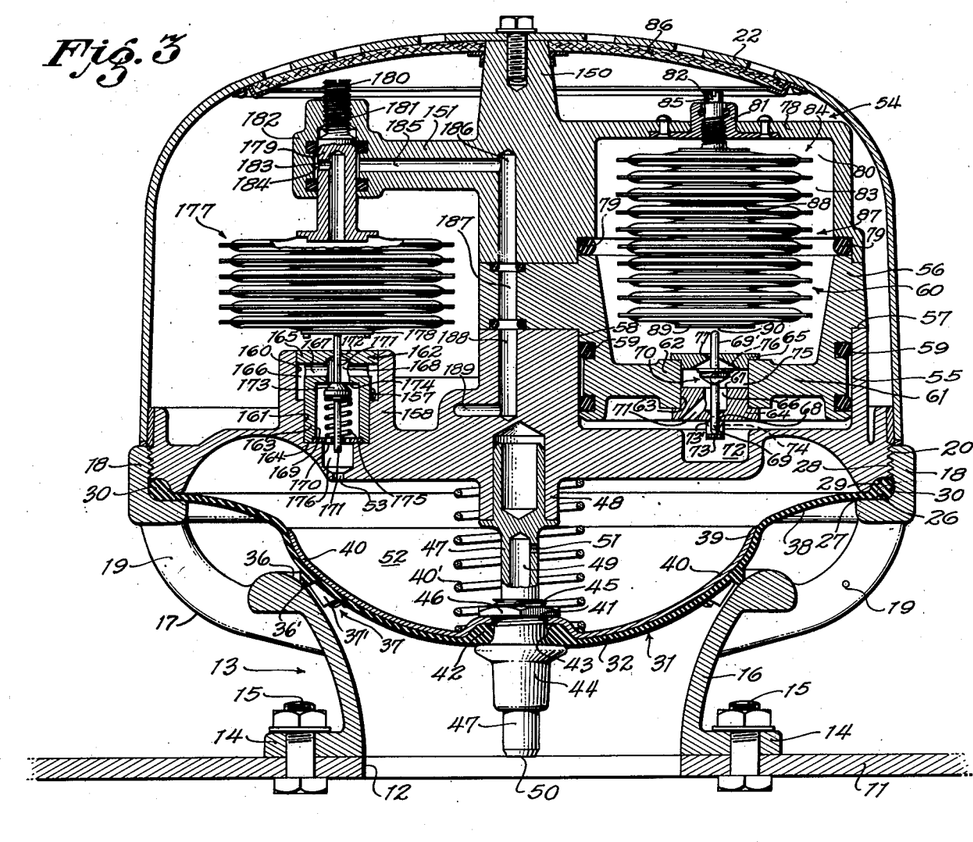
Fig. 3 is a view in transverse vertical section through the main valve unit as shown on the line 3—3 of Fig. 2 and discloses the relationship between the combat-pressure ratio control valve and the pressure differential control valve.

Referring more particularly to the drawings, 10 indicates an automatic regulating valve with which the present invention is concerned. Specifically, this valve has been designed to be mounted upon the interior face of an airplane cabin wall 11 and over an opening 12 in the wall, which opening communicates with ambient atmosphere within which an airplane is in flight. The regulator valve structure comprises a substantially circular base portion 13 having a bolting flange 14 adapted to lie flat against the inner face of the cabin wall 11 and to be secured in position by bolts 15. The base 13 is a shell-like structure having a tubular outwardly flaring neck 16, with the small end of which the bolting flange 14 is formed. The walls of the tubular throat continue outwardly into a bowl-like structure 17 which represents a segment of a sphere and is formed with an annular threaded flange 18 around its mouth. Formed at intervals through the wall of the bowl-like structure 17 are openings 19 which establish communication between the interior of the cabin and the interior of the bowl. The annular flange 18 of the bowl is internally threaded, as indicated at 20, and receives a valve frame 21 which carries the various pilot valve units required in the device, as will be hereinafter described. Mounted over the frame is a dome-shaped shell 22 which forms a housing for the pilot valve structure, as will be hereinafter described. At the juncture of the bowl portion 17 and the annular flange 18 is a valve seat 26. This seat is substantially in the form of a semicircular groove and has a curved face 27. The valve frame 21 is formed with an annular threaded portion 28 which engages the threaded bore 20 of the flange 18 and is fitted with an annular inwardly inclined gripping face 29. This face cooperates with the groove 26 and the face 27 to receive and grip an annular bead 30 which is formed along the circumferential margin of a flexible main valve diaphragm 31. The main valve diaphragm 31 is preferably made of low temperature synthetic rubber reinforced with nylon fabric. The diaphragm is circular in shape and is formed around its marginal lip with the bead 30, the main body of the diaphragm being defined by a central portion 32 presenting a convex lower face to an outlet port 33 of the throat portion 16. This convex face is of a diameter substantially agreeing with the diameter of the inner ends of the perforations 19 as indicated at 34. Thus, the inner convex face 35 of the throat wall 16 and the contiguous convex face of the diaphragm portion 32 will tend to converge along an annular valve seat area generally indicated at 36 in Fig. 3 of the drawings. The underface of the portion 32 of the diaphragm 31 adjacent the valve seat 36 is formed with a plurality of outwardly extending ribs and intermediate serrations 37 which are formed integral with the diaphragm wall and contact the surface 35 of the throat to tend to hold the convex face of the diaphragm portion 32 away from the throat surface 35 so that a minimum circulation of air may take place through the throat 33 and the perforations 19 under all normal conditions.

By reference to Fig. 10 of the drawings it will be seen that the serrations 37 are defined by relatively narrow, separately spaced ribs 37', which ribs are triangular in longitudinal section, the outer faces of said ribs being substantially tangent to the surface 35. The outer ends of the ribs merge with an annular rib 36' which is of a depth to rest against the surface 35 while the outer tangent surfaces of the ribs 37' clear the surface 35. It will be recognized that the pressure of cabin air which tends to pass between the main valve diaphragm and the surface 35 of the throat 16 will be greater than the pressure of the ambient air prevailing in the port 33. Thus, the air passing beneath the annular rib 36' and between the radial ribs 37' will enter a relatively low pressure area so that the discharging air will be turbulent and will tend to maintain the diaphragm free from alternating aero-dynamic pressure changes under all working conditions. It is to be understood that the thickness and character of the diaphragm 31 is such as to insure that the diaphragm will have a desired degree of flexibility, and that the members 36' and 37' will also have desired flexibility. It should also be explained that the ribs between the serrations 37 will be uniformly and circumferentially spaced around the diaphragm.

The convex portion 32 of the diaphragm 31 merges into an annular portion 38 which occurs between a sectional portion of ogee curve, as indicated at 39, and the bead 30 of the diaphragm. The annular portion 38 may be considered as being concave with reference to the inner curved face of the base 17 in the portion of the base through which the perforations 19 are formed, and which portion extends from the gripping shoulder 27 to the main valve seat 36. The central portion 32 of the diaphragm 31 is suitably reinforced by a shell 40 which conforms to the concaved surface of the diaphragm and is of an overall diameter sufficient to overlap the convex valve seat 36. The shell 40 is preferably made of light metal, such as magnesium. The center of the shell is formed with an opening 41 which is counterbored to receive a reinforcing bead 42 formed around a central opening 43 in the diaphragm 31. This opening receives a sleeve 44 having a threaded portion 45 carrying the clamping nut 46. The sleeve is mounted slidably upon a central tubular stem 47 which is fixed in the central bore of a boss 48 carried by the valve frame 21. A central tubular passageway 49 is formed within the stem 47 and is open at its outer end 50, the inner end being closed. In the portion of the wall of the stem 47 occurring between the sleeve 44 and the boss 48 is a vent opening 51 through which air will flow from the chamber 52 which occurs between the main frame 21 and the contiguous face of the main diaphragm 31. It is intended that the chamber 52 shall receive cabin air as controlled by the various valve structures to be hereinafter described, and that the cabin air shall create a counter-pressure against the inner face of the diaphragm 31 by which the flexible wall of the chamber 52 is defined. The cabin air enters the pressure control chamber 52 through a port 53 in a controlled air stream and bleeds from the chamber 52 through the vent opening 51 and the passageway 49 of the tubular stem 47.

The fundamental principle of the present invention is concerned with the positioning of the main valve diaphragm 31 with relation to its seat while the outer face of said diaphragm is simultaneously subjected to the pressure of an outflow stream of cabin air and the pressure of ambient air while the inner surface of the diaphragm 31 is subjected to the pressure of a controlled stream of cabin air which bleeds through the opening 51 and into the ambient atmosphere. This stream of cabin air is controlled by a series of valves and fluid pressure responsive elements which insure that for any given ambient air pressure only one cabin air pressure is available, and that the fluid pressure responsive elements will sense the variations in pressure conditions to establish the air pressure within the cabin with reference to the ambient air pressure on the exterior thereof. The control air pressure stream which is introduced into the pressure chamber 52 through the port 53 passes in sequence through three valve structures. The first of these valve structures is designated as a combined combat or pressure ratio valve. The second valve structure is designated as an isobaric control valve, and the third valve structure is designated as a pressure differential control valve. It should be emphasized that the main diaphragm valve 31 is not motivated to assume a closed position by the control air stream from the cabin but this pressure exerted upon the inner face of the diaphragm 31 appropriately opposes the collective pressures exerted by direct cabin pressure and direct ambient air pressure on the outer surface of the diaphragm. These pressure balances are established and maintained by the fluid pressure responsive sensing means associated with the series of valves through which the control air stream passes in sequence. It is also to be emphasized that when the aircraft is in flight the main valve diaphragm 31 will assume an open position which will vary in area as established by the pressure balance existing in the pressure chamber 52, which balance is controlled by the variable air flow into the chamber through the poppet valves and a fixed air flow out of the chamber through vent 51. A spring of light strength, as indicated at 40', acts between the shell 40 and the face of the valve frame 21 to exert sufficient force to overcome inherent resistance of the main valve diaphragm 31 as well as the friction incident to the movement of the sleeve 44 on the stem 47.

Figure 6:
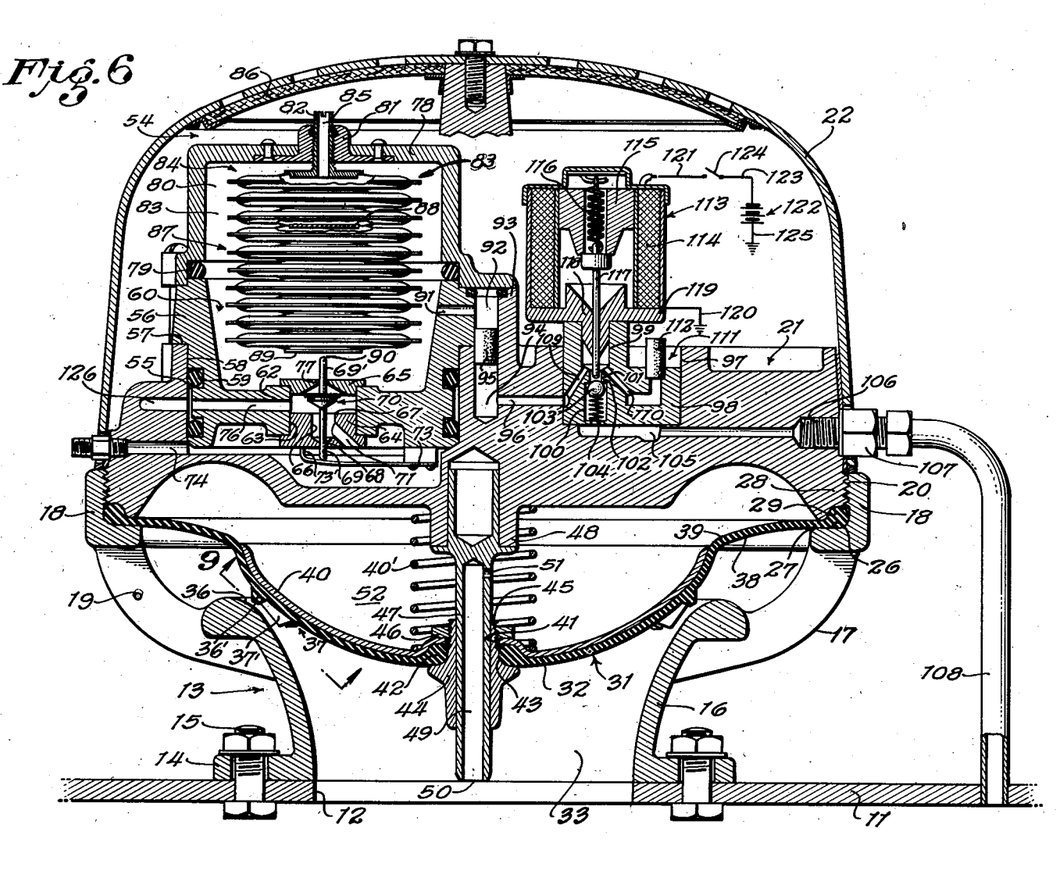
Fig. 6 is a view in vertical section as seen on the line 6—6 of Fig. 2 and shows the combat control valve and the solenoid associated therewith.

The first valve structure through which the control air stream passes is the combined combat or pressure ratio valve unit generally indicated at 54, and illustrated specifically in Fig. 6 of the drawing. The valve frame 21 is provided with a cylindrical bore 55 having an axis parallel to the central axis of the valve frame and the tubular stem 47 but offset therefrom. This bore receives a cylindrical valve housing 56 having a shoulder 57 which rests against the end of the portion of the valve frame 21 circumscribing the bore 55. The valve housing has a reduced cylindrical portion 58 which telescopes into the bore 55 and carries packing members 59 by which a fluid-tight joint is made between the wall of the bore 55 and the housing 56. A central cup-shaped cavity 60 is formed by the housing 56 and is closed at its lower end by a transverse web 61. The web 61 is formed with a central bearing portion 62 having a bore 63 therethrough. This bore receives complementary valve seat bushing 64 and 65. The lower bushing 64 is formed with a central bore 66 which is substantially closed at its lower end and provides a valve seat 67 at its upper end. Formed centrally through the lower end of the bore 66 is a center bore 68 to receive the stem 69 of a poppet valve 70. A lateral bore 71 extends from the center bore 68 to an air space 72 which occurs between the lower face of the housing 56 and its web 61 and the upper face of the valve frame 21. A suitable spring 73 acts against the end of the valve stem 69 and tends to hold the poppet valve 70 off of its seat 67. Attention is directed to the fact that the poppet valve 70 and the other valves which will be hereinafter described are all designed to open in the direction of the air stream flow. This is to obtain stability of the poppet valve. The air space 72 communicates with a duct 74. This duct extends through the wall of the valve frame 21 and may receive cabin air from the cabin through filters, or may be connected by a conduit with a remote control panel, the details of which will be disclosed in a separate application. In either event a control stream of cabin air is thus provided to flow through the apparatus and to be debouched eventually into the pressure chamber 52 through the port 53. A passageway 75 occurs between the bushing members 64 and 65 and is disposed above the valve seat 67. This passageway communicates with an air duct 76 through which the controlled flow of cabin air may pass, as will be hereinafter described.

Attention is directed to the fact that in Fig. 6 of the drawing the free end of the spring 73 is formed with an extension part 73' which rests against the end face of the bushing 64 and limits the movement of the valve stem 69 and the valve 70. Thus the spring 73 acts normally to hold the valve stem a predetermined distance away from its seat 67. The valve stem 69 has a portion 69' which passes through an opening 77 of the bushing 65 and projects a predetermined distance therebeyond, as determined by the limiting movement of the extension 73' of the spring 73. Mounted over the end of the housing 56 is an air-tight housing cover 78. This cover has an hermetically sealed joint, as indicated at 79, so that an air space will be created within the housing and cover, as indicated at 80. The closed end of the cover 78 is fitted with a threaded bushing 81 which receives the threaded adjusting stem 82 of a fluid pressure sensing unit generally indicated at 83. This unit includes a Sylphon bellows 84 which is fixed to one end of the stem 82 and the interior of which communicates with a central passageway 85 extending through the stem 82. The outer end of the passageway 85 is in direct communication with cabin air under cabin pressure. This air of course may flow from the cabin through filters 86 carried in the dome-shaped cover shell 22, which shell is mounted upon the valve frame 21. The Sylphon bellows 84 is designed to a differential pressure control bellows, since in its normal operation cabin air pressure prevails within the bellows 84 as well as the chamber 83 which is occupies.

Formed integrally with the pressure differential bellows 84 is an altitude compensating bellows 87. This bellows is hermetically sealed from the differential pressure bellows 84 by an intermediate partition plate 88, and the bellows 87 is evacuated so that it will be of the aneroid type. The relative lengths of the bellows 84 and 87 are determined by appropriate calculation, and the combined lengths of these bellows when at rest have a definite overall length so that the free end face 89 of bellows 87 bears a definite relation to the free end of the valve stem 69'. It is contemplated that a space 90 will occur normally between the end face 89 and the valve stem 69', and that this space can be adjusted by rotating the threaded stem 82 in the bushing 81. This adjustment establishes the initial control point of the bellows.

The chamber 83 which is occupied by the bellows 84 and 87 may be filled with air delivered from the cabin at cabin pressure or may be filled with ambient air at prevailing atmospheric pressure. This air supply may be selected alternately by electric control means. In Fig. 6 it will be seen that a passageway 91 is formed through the wall of the housing 56 and communicates with a passageway 92. The passageway 92 extends through a boss 93 carried by the housing 56 which is sealed at its upper end by the cover cap 78 and at its lower end by engagement with the contiguous face of the valve frame 21. The passageway 92 is aligned with a passageway 94, and interposed at a point in the length of these passageways is a restrictor 95. This restrictor is preferably made of ceramic material which is foraminous in character. The restrictor acts to slow down the flow of air, making a change from normal conditions to combat conditions and reverse take place gradually to prevent a sudden change in cabin pressure. A duct 96 communicates with the closed end of the passageway 94 and leads to a cylindrical bore 97 formed in the valve frame structure 21. This bore receives a valve cage 98 which fits within the bore 97 and is formed with a central passageway 99 at one end of the member 98 while a bore 100 is formed at the opposite end of the member 98. An intermediate partition wall 101 separates the bores 99 and 100 and provides a valve seat 102 for a ball valve 103. The ball valve 103 is held against its seat by a spring 104 which rests against a shoulder adjacent the end of the bore 100. A passageway 105 communicates with the bore 100 and leads to a connection 106 which receives a coupling 107 to which a pipe 108 is secured. The pipe 108 leads through the cabin wall 11 and serves as a conduit for ambient air. Normally the valve ball 103 is on its seat and prevents equalization of the cabin air pressure within the chamber 83 with the pressure of ambient air delivered through the conduit 108. Communicating with the bore 99 of the valve cage 98 is a duct 109 which leads to the duct 96. There is also a duct 110 which leads to a passageway 111 carrying a restrictor 112 similar to the element 95 previously described and provided to function in the same manner. Cabin air under cabin pressure may flow normally through the restrictor 112, through the duct 110 to the bore 99, and then through the ducts 109 and 96 to the passageways 94 and 92, and then into the chamber 83 through the passageway 91. By this arrangement the air within the chamber 83 will be under the prevailing cabin air pressure.

Mounted at the outer end of the valve cage 98 is a solenoid structure 113. This structure includes a suitable magnetic coil 114 within which a movable armature 115 is mounted. The armature is held in its uppermost position by a spring 116 and carries a plunger rod 117 at its lower end. The plunger rod 117 extends downwardly through a bearing 118 formed as a part of the solenoid case 119. The lower end of the rod 117 extends into the opening 101 and is normally spaced from the bearing ball 103 so that the bearing ball may seat freely on the valve seat 102. The magnetic coil 114 is connected to a ground wire 120 at one end and to a feed wire 121 at its opposite end. A source of electric energy is provided as indicated at 122 and has a conductor 123 leading to a combat control switch 124. When this switch is closed it establishes electrical connection with the conductor 121. The opposite side of the source of electric energy 122 is provided with a ground wire 125.

It will be evident that when the valve ball 103 rests against the seat 102 air pressure within the chamber 83 and around the aneroid bellows 84 and the altitude compensating bellows 87 is cabin air pressure, due to the fact that cabin air flows around the valve 103 through the ducts 109 and 110. When, however, the combat switch 124 is closed, as would be desirable when the aircraft is in danger of imminent combat, the valve ball 103 will be moved from its seat, allowing the pressure of the cabin air within chamber 83 to escape through the passage 105 and thus equalize in pressure with the ambient air pressure within the passageway 105. This reduces the pressure of air within the chamber 103 to a pressure less than cabin pressure and permits the bellows 84 and 87 to expand and to close the gap 90 between its face 89 and the valve stem 69'. This appropriately moves the poppet valve 70 with relation to its seat 67 and regulates the amount of control air which flows into the pressure chamber 52 defined by the main valve diaphragm 31, and thereby maintains the cabin pressure at a desired pressure ratio with relation to the ambient air pressure, as will be required for combat flying.

In the sensing device, as previously described, which includes the differential pressure bellows 84 and the aneroid bellows 87, the differential pressure bellows 84 is actually in control of movement of the poppet valve 70 but is compensated for altitude by the aneroid bellows 87. After the bellows assembly, including the bellows 84 and 87, distends to move the poppet valve 70 and to control the position of the poppet valve 70 with relation to its seat 67 there can be only one given cabin differential pressure for any given flight altitude. Under normal conditions the bellows assembly, including bellows 84 and 87, are in an environment of air under cabin pressure, and when the combat control switch 124 is closed these bellows will be in an environment of air at ambient air pressure and will respond accordingly.

The control air stream which passes between the valve seat 67 and the poppet valve 70 flows, as has been previously explained, through a duct 76. This duct is preferably formed in the valve frame 21 although it may be defined by a tubular conduit if desired. In the diagram shown in Fig. 7 a conduit 126 is indicated as containing the duct 76. This conduit leads to an isobaric pressure valve housing 127 which is formed as a part of the frame 21. The conduit 126 communicates with a port 128 formed through the side wall of the housing 127 adjacent its upper end. The interior of the housing is formed with a main bore 129 and an upper counterbore 130. At the bottom of the main bore 129 is a well 131 of reduced diameter. A shoulder 132 is formed at the bottom of the main bore 129 and receives the end face of a valve bushing 133. The valve bushing 133 has a lower diameter agreeing with the diameter of the bore 129 and an upper portion of larger diameter to agree with the counterbore 130. The upper portion of the bushing is formed with two annular shoulders 134 and 135 between which an annular groove 136 occurs. The groove 136 registers with the port 128 formed through the wall of the valve housing 127. The lower edge of the annular shoulder 135 is spaced from the bottom end face 137 of the counterbore 130. This causes an annular passageway 138 to occur between the lower face of the shoulder 135 and the face 137. An outlet port 139 is formed through the wall of the valve housing 127 to communicate with the space 138. The interior of the valve bushing 133 is formed with a lower bore 139 of relatively large diameter which is partially closed at its upper end by an end wall 140 which provides a valve seat 141 against which an isobaric poppet valve 142 is positioned. A helical spring 143 is interposed between the valve 142 and a perforate partition member 144 at the lower end of the bushing 133. This spring tends to hold the poppet valve 142 against its seat and against the pressure of cabin air which is acting against the opposite face of the poppet valve. Extending upwardly within the valve bushing 133 and above the valve seat 141 is a bore 145 of reduced diameter. This bore communicates with radial passageways 146 extending from the bore 145 to the annular groove 136, and through which cabin air may enter the valve bushing and exert pressure against the upper face of the isobaric poppet valve 142. The isobaric poppet valve 142 has a downwardly extending stem portion 147 which is guided through the member 144 and an upwardly extending stem portion 148 which passes through an opening 149 in the end of the bore 145.

Figure 1:
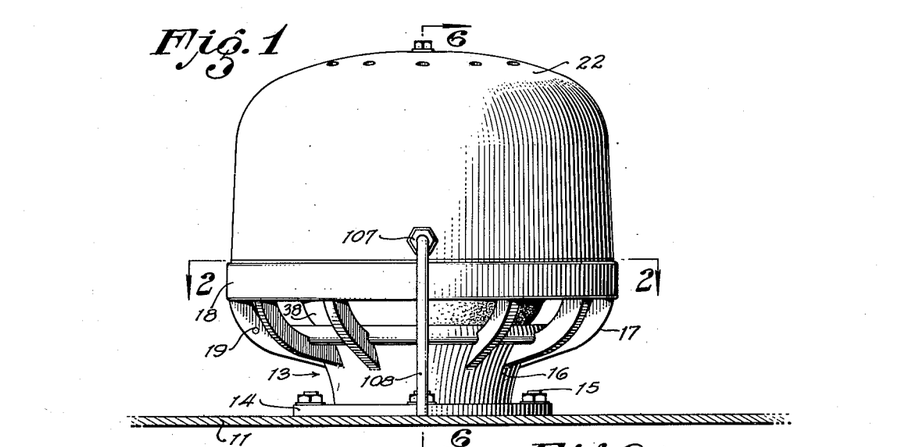
Figure 1 is a view in elevation showing the completely assembled regulating valve unit with which the present invention is concerned.
Figures 2, 5:
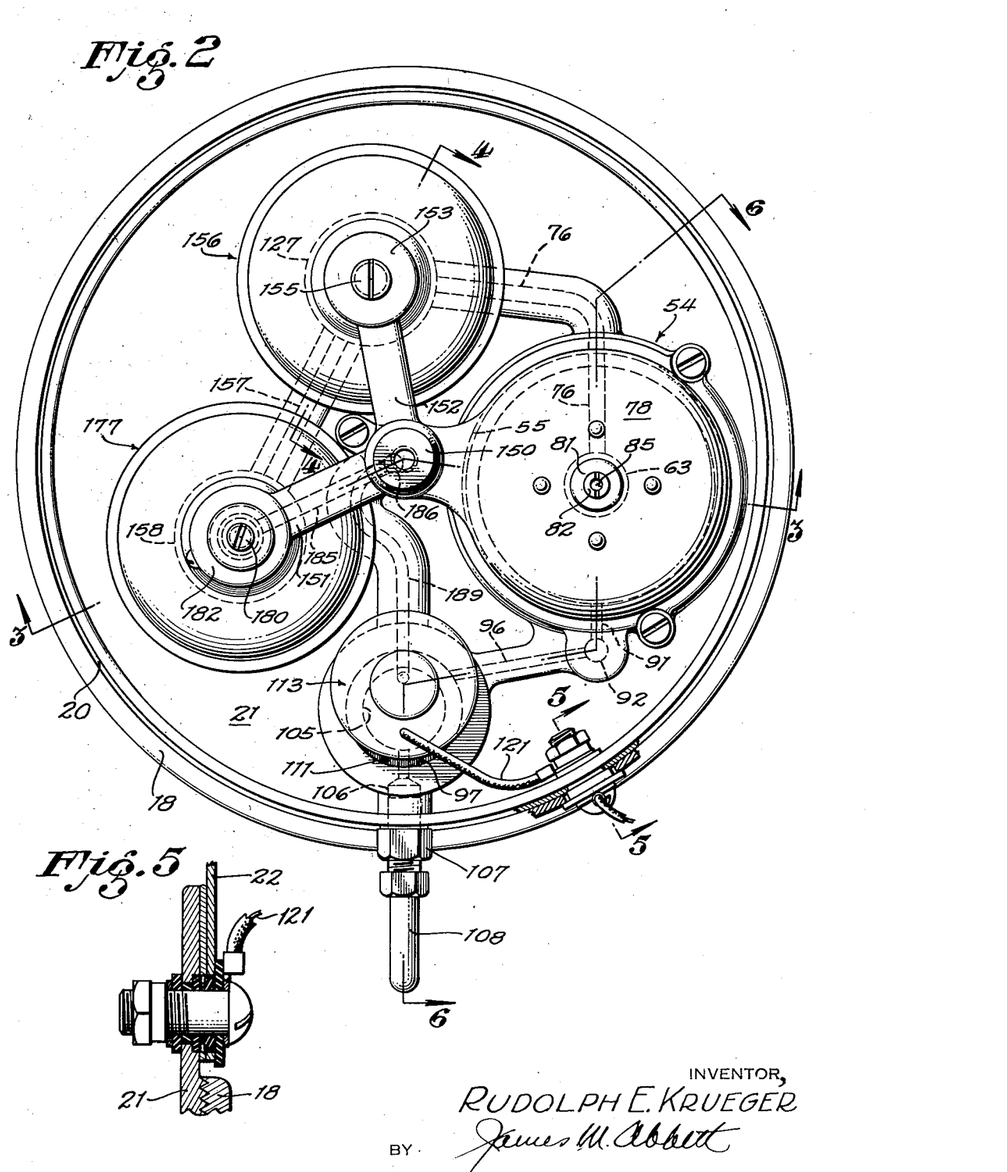
Fig. 2 is a view in plan showing the regulating valve unit with its cover removed to more clearly disclose the relationship of the various pilot valves and pressure sensitive bellows.
Fig. 5 is a view in transverse section through the valve structure as seen on the line 5—5 of Fig. 2 and discloses a terminal connection for electric conductors.
Figure 7:
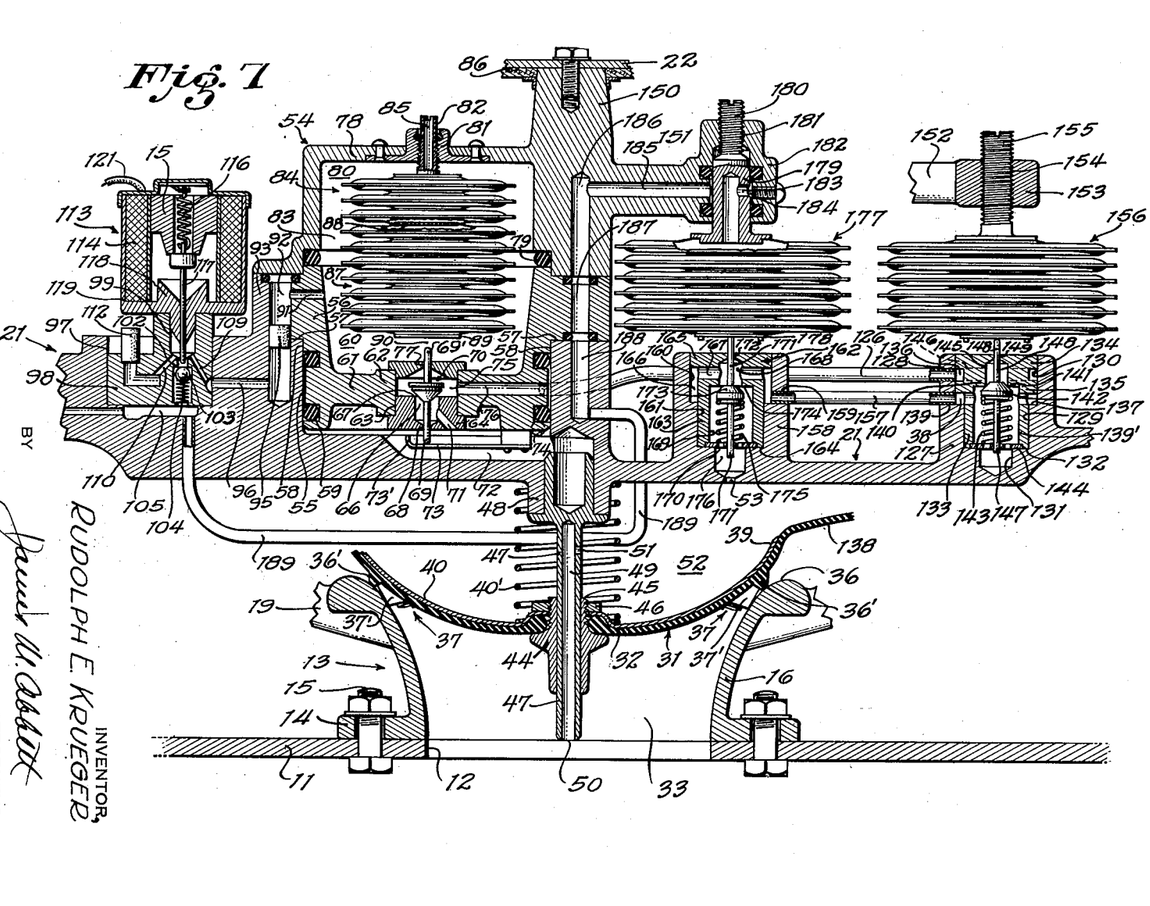
Fig. 7 is a schematic view indicating the pilot valve air stream leading to the regulating valve and the pilot valves disposed in series along said air stream, and showing the regulating valve in its closed position.

Formed integrally with the cover member 78 previously described and disclosed in Fig. 6 of the drawings is a center bracket member 150 which carries a pair of radial arms 151 and 152, as shown in Fig. 2 of the drawings. The arms are disposed at desired angles with relation to each other and preferably lie in the same plane normal to the center axis of the entire regulating valve structure. The arm 152 is formed at its end with a boss 153 having a central threaded bore 154. This bore receives the threaded stem 155 of isobaric bellows 156. The isobaric bellows 156 is of the aneroid type. It is disposed above the stem 148 of the poppet valve 142 and its exterior is subjected to cabin pressure. Normally the poppet valve 142 is held in a closed position by the valve spring 143 and as the cabin pressure acting against the exterior of the bellows 156 reduces in value the bellows will be distended so that its end face will contact the end of the valve stem 148 and tend to move the valve 142 away from its seat 141 and to thus establish communication between the induction port 136 and the eduction port 137. An air duct 157 communicates with the eduction port 137, and as shown in Fig. 4 of the drawing this duct is incorporated within the valve frame structure 21. In Fig. 7 of the drawing the duct is indicated as being a tube leading to a pressure differential control valve housing 158. This housing is also formed as a part of the valve frame structure 21. The valve housing 158 is tubular and is formed in its side wall with an induction port 159. This port communicates with a counterbore 160 formed in the upper end of the member 158. A reduced bore 161 is formed in the housing and communicates with the counterbore 160. A valve bushing 162 fits within the axially aligned bores 160 and 161. This bushing comprises a lower tubular extension 163 which rests upon a shoulder 164 at the bottom of the bore 161. The upper end of the bushing 162 is formed with an enlarged disc portion 165 which fits the bore 160 or may have a threaded connection therewith. In view of the relative widths of the disc portion 165 and the depth of the bore 160 an annular flow passageway 166 is formed around the bushing and beneath the disc portion 165. The port 159 communicates with this passageway. Radial ducts 167 are formed through the bushing to communicate with the passageway 166. The inner ends of these ducts are in communication with a central bore 168 of the bushing 162. The lower end of the central bore 168 communicates with an enlarged bore 169 formed within the tubular extension 163 of the valve bushing 162. The lower end of the bore 169 is partially closed by a perforate disc 170 which rests upon the shoulder 164 and is held in place by the bushing 162. A central opening through the perforate plate accommodates the lower end of a valve stem 171. This stem extends upwardly through the central bore 168 and through a reduced opening 172 to a point beyond the upper face of the valve bushing 162. Mounted upon the stem 171 within the bore 169 is a poppet valve 173. This valve is urged upwardly against a valve seat 174 by a valve spring 175. When the valve 173 is open air will pass downwardly through the bore 169 and to a passageway 176 leading to the outlet opening 53. The poppet valve 173 is moved from its seat by a pressure differential control valve bellows 177. This bellows is provided with a plate 178 at its lower end which moves to an abutting position against the end of the valve stem 171. The opposite side of the bellows is fitted with a tubular stem 179 which is closed at its upper end. This stem has a reduced end portion 180 which is externally threaded and passes through a threaded bore 181 of a boss 182. The boss 182 is carried at the outer end of the arm 151 which is carried by the bracket member 156. Due to the threaded connection between the threaded bore 181 and the threaded stem 180 the bellows 177 may be moved bodily to produce proper adjustment between the end plate 178 and the poppet valve stem 171. An air port 183 is formed through the wall of the tubular portion 170 of the stem and communicates with an annular passageway 184 within the boss. The passageway 184 also communicates with an air duct 185 which extends through the arm 151 and communicates with a vertical duct 186 extending downwardly and being in register with a duct 187 formed through the cylindrical valve housing 56. The duct 187 is also in register with a duct 188 which is formed in the valve frame structure 21. This duct is closed at its lower end but has an outlet conduit 189 in communication therewith. The outlet conduit 189 is in communication with the passageway 105 occurring beneath the valve cage 98. This cage is shown particularly in Figs. 6 and 7 and is a part of the combat valve structure. As shown in Fig. 6, the passageway 105 communicates through passageways 107 and 108 with the ambient atmosphere. Thus, the interior of the pressure differential bellows 177 is in communication with ambient atmospheric pressure, and the exterior of the bellows is subjected to cabin pressure.

Before entering into a detailed explanation of the performance of the regulating valve with which the present invention is concerned, certain salient features of the design of the valve should be pointed out. Attention is first called to the fact that the main valve diaphragm 31 performs the dual purpose of providing a power source and an outlet valve. This makes it possible to design a valve which will occupy a minimum space. Valve diaphragm 31 is divided into approximately three parts of substantially equal surface area. The center part of the valve 31 is represented by the area of the valve which extends across the throat port 33. This area is approximately one-third of the area of the diaphragm 31. The peripheral third of the valve diaphragm is largely restrained by the supporting frame structure within which its periphery is held. The intermediate valve diaphragm area occurs between the inner and outer areas and may be considered as balancing the central third (rigid valve portion) of the diaphragm valve area which spans the throat port 33. It is to be understood that the central area of the diaphragm 31 is subjected to the pressure of the ambient atmosphere since the port 33 provides a conduit through the cabin wall 11, and that the intermediate and outer diaphragm areas are subjected constantly to cabin pressure through the openings 19 in the bowl 17. It is also to be pointed out that upon the opposite surface of the entire diaphragm from those surfaces previously described a controlled flow of cabin air exerts pressure uniformly. This surface of the diaphragm will be hereinafter designated as the inner surface of diaphragm 31, and the opposite surface of the diaphragm will be hereinafter designated as the outer surface of the diaphragm, for sake of clarity.

While the inner surface of the diaphragm 31 is subjected uniformly to the pressure of the cabin control air stream entering the pressure chamber 52 through the inlet port 53, the outer surface of the diaphragm is in effect divided into the central area extending across the throat 16 and subjected directly to ambient atmospheric pressure and a circumscribing area extending between the valve seat 36 and the periphery of the diaphragm, and which area is subjected directly to cabin air pressure. These two outside areas are of selected proportion to each other to obtain the desired equalization between the pressure drop from cabin pressure to control chamber pressure, and the pressure drop from control chamber to ambient atmosphere. This condition will occur when the regulating valve is in operation and the diaphragm 31 is in equilibrium. The reason for this feature of design is to obtain equal pressure differentials across the vent port 51 and the poppet 162. This is essential in order to maintain control with a relatively constant poppet valve gap over a wide range of changes in the differential between cabin air pressure and ambient atmospheric pressure. If this condition did not prevail and the poppet valve gap had to be varied over a range of pressure differential the isobaric control valve bellows 156 would be required to extend or contract, and this would only be accomplished by a different absolute pressure. In practice, with proper design, the change in isobaric pressure setting can be held to 1½ inches to 2 inches of water over a range of cabin pressure differential from zero to six pounds per square inch. This insures that the cabin may be maintained at a substantially set pressure. This also insures that the area of the controlling poppet valve gap will not be required to vary to supply the proper amount of air to the pressure chamber 52. By this arrangement it will not be necessary for the control bellows, for the various poppet valves, to assume a new control position which would be reflected in a new control pressure.

The desired equalization of pressure drop from cabin to control chamber and from control chamber to atmosphere is accomplished by arranging the aforesaid central and circumscribing areas so that they have substantially equal pressure responsive effectiveness. If these areas were both in the nature of piston surfaces, this condition would be satisfied by making them of equal area. However, where a diaphragm is utilized, with its periphery fixed to the valve casing, the relationship is governed by the principle that the effective area of a diaphragm is approximately one half its actual area (the relationship of effective area to actual area is almost never an exact 1:2 relationship, since the stiffness of the diaphragm adjacent its periphery affects the ratio). With the particular diaphragm shown herein, the rigid central valve portion of the diaphragm is equivalent to a piston, its effective area being substantially equal to its actual area. The 1:2 ratio relationship between the effective and actual areas governs the flexible portion of the diaphragm (the circumscribing area). Accordingly, the desired relation between circumscribing and central areas is achieved in the specific valve shown herein, by proportioning them so that the area of the circumscribing portion is substantially twice that of the central portion. Thus is derived the above noted relation in which the peripheral third of the diaphragm, being restrained by rigid attachment to the valve casing, is largely unresponsive to pressure changes, so that the intermediate third may be considered to have approximately an effective area balancing that of the central third.

From the above, it will now be clear that the balancing of control chamber pressure against the dual pressures on the outer surface of the diaphragm may be represented by the following equation:

$$P1A1 = P2A2 + P3A3$$

where $P1$ = control chamber pressure;
$A1$ = total effective diaphragm area;
$P2$ = ambient pressure on central valve portion;
$A2$ = effective area of central valve portion;
$P3$ = cabin pressure on circumscribing portion;
$A3$ = effective area of circumscribing portion.

This is merely a mathematical expression of the obvious fact that the total forces (pressure times effective area) acting on the inner surface of the diaphragm, must equal the total forces acting on the two areas of the outer surface of the diaphragm, when the valve is in modulating operation.

Also, $$A2 = A3$$

This is a mathematical expression of the above discussed relationship in which effective areas of the central and circumscribing portions of the outer diaphragm surface are substantially equalized.

Furthermore, it will be apparent that $$A1 = A2 + A3$$

since the effective areas on both sides of the diaphragm are equal; and accordingly, $$A1 = 2A2 = 2A3$$

and $$\tfrac{1}{2}A1 = A2 = A3$$

Thus the original equation may be converted to $$P1A1 = \frac{P2A1}{2} + \frac{P3A1}{2} = \frac{(P2+P3)A1}{2}$$

and therefore $$P1 = \frac{P2+P3}{2}$$

which is the mathematical expression for the relation: control pressure equals the mid value between cabin and ambient pressures.

All of the poppet valve structures are designed to insure that the controlled air stream from the cabin to the pressure chamber 52 will be restricted actually by the poppet valve springs as the poppet values are held to their seats or follow the control bellows. All of the poppet valves are thus disposed to move from their seats in the direction of the air-flow stream passing through the valve structure. This is for the reason that it has been found that if the control air-flow stream moves in a direction opposite to that of the valves as they open an unstable condition will be obtained due to the pressure differential existing across the various poppet valves. This instability and resultant surge is caused in the following manner: Assuming that the air-flow is in the wrong direction and that a particular poppet valve is in a condition of control, the pressure differential across that particular poppet valve is at a certain value, and the resultant force transmitted to the corresponding bellows is at a corresponding value. If this bellows reacts to a cabin pressure change and seeks to correct this change by extension or contraction the poppet will be moved closer to or farther away from the poppet seat. If the movement is toward the poppet seat then the pressure differential across that particular poppet valve will increase and the resultant load wall be greater, thus tending to move the poppet valve closer to its seat. This tendency will be resisted only by the control bellows, which is in fact a relatively sensitive spring, and therefore, cannot adequately resist the impulse. Conversely, when a particular bellows moves a poppet valve away from its seat the force on the poppet valve diminishes and the spring of the bellows will push the poppet valve too far. This will cause a surge to take place as control air flows into the pressure chamber 52. When the valves are constructed to follow the direction of flow as they open and in opposition to the force of the valve springs, this surge will be eliminated.

In explaining the operation and function of the regulating valve with which the present invention is concerned, the cycle of operation from the take-off to the landing of an aircraft will be described in orderly sequence. The cabin, having walls 11, is hermetically sealed, and the air regulating valve unit with which the present invention is concerned is mounted over an opening 12 through the cabin wall, which opening is in register with the throat 33 of the base structure 13. At another point in the cabin wall an opening has been formed through which air is delivered from a supercharger and from a source of ram air. This air is controlled as to velocity and density by a valve structure which is disclosed in my co-pending application entitled "Method of Introducing Air Into an Aircraft Cabin and a Mass Flow Valve Therefor." By the separate operation of the mass flow valve and the regulating valve a desired air pressure is established and maintained within the cabin in accordance with a predetermined schedule. When the structure has been properly assembled and the aircraft rests upon the ground the diaphragm 31 of the regulating valve 10 is in its closed and seated position across the throat 33 of the base 13. At that same time the poppet 142 of the isobaric control valve will be resting upon its seat 141, as held by the spring 143. The isobaric control bellows 156 will be in its contracted position. The poppet valve 173 of the pressure differential control valve unit will be held from its seat by the distended pressure differential bellows 177 in opposition to the force of spring 175. The combined combat or pressure ratio valve structure 54 will at this time be in a condition so that the poppet 70 will be held off of its seat 67 by the spring 73, and the valve will thus be open. It is to be understood that the bellows unit, comprising the bellows 84 and 87, will be properly adjusted by rotation of the threaded stem 82 within the bushing 81 so that a desired space 90 will occur between the end of the valve stem 69' and the end plate 89 of the bellows 87. It will of course be understood that the isobaric control bellows 156 is adjusted by means of the threaded stem 155 within the boss 153 so that the end face of bellows 156 will bear a desired relation to the end of the valve stem 146. The pressure differential control bellows 177 will also be adjusted so that its end plate 178 will bear a desired relationship to the end of the valve stem 171. With the sensing elements of the regulating valve 10 in the normal position, as described, the aircraft engine is started and the supercharger forces air into the cabin to fill it up. A desired rate of flow for the incoming air may be approximately five pounds per minute. The pressure in the cabin will be increased in proportion to the rate of air flowing into the cabin with relation to the restriction of outflow air as controlled by the main diaphragm valve 31. While the aircraft is still on the ground air pressure will build up across the diaphragm 31 until the force of air impinging against the outer and intermediate areas of the main valve diaphragm 31 will be sufficient to force the diaphragm 31 an appropriate distance off of the valve seat area 36 of the base 13. The pressure of air as it exists within the pressure chamber 52 and on the inside of the diaphragm 31 will be equal to the pressure exerted by the cabin air on the outside of the diaphragm 31 since the isobaric valve structure including the poppet valve 142 rests upon its seat 141 and is closed. The diaphragm 31 thus tends to move to an open position until a desired pressure differential for a particular rate of air-flow into or out of the cabin is reached. Attention is directed to the fact that the spring 40' which acts against the inner face of the main valve diaphragm 31 tends to overcome friction and the resistance which is produced by inherent stiffness of the diaphragm material. In the condition just described the aircraft is ready to take off. The air pressure differential across the valve diaphragm 31 will represent approximately four to six inches of water. This pressure is sufficient to hold the valve diaphragm 31 off of its seat 36. Assuming that the isobaric pressure bellows 156 has been set so as to affect the poppet valve 142 at an altitude of five thousand feet the isobaric bellows 156 will continue to expand longitudinally as the aircraft climbs. This takes place until the poppet valve 142 has been lifted from its seat. When the poppet valve 142 is lifted from its seat 141 the control flow of cabin air will then pass through the filters 86 in the shell 22 and will then flow through duct 74 to the space 72, and then upwardly through the passageway 71 into the space 66 beneath the valve 70, which valve is normally in an open position with relation to its seat 67. Air will then flow into duct 75 and along the air passageway 126 to the isobaric control valve unit including the poppet valve 142 and its seat 141.

It should be pointed out with reference to Fig. 6 that cabin air at this same time flows through the restrictor 112 into the duct 111, and then through a duct 96 to a passageway 94. Within this passageway a restrictor 95 is disposed through which the air passes to a passageway 92. Duct 91 establishes communication between the passageway 92 and the air chamber 83 within which the differential pressure bellows 84 and the altitude compensating bellows 87 are disposed. It will thus be seen that under normal conditions of the combat valve ball 103 the chamber 83 will be filled with air from the cabin and will be at prevailing cabin air pressure. The controlled air-flow through duct 126 will be directed into duct 157 when the poppet valve 142 has moved off of its seat under influence of the isobaric bellows 156.

By reference to Fig. 9 of the drawing it will be seen that the graph indicates constant change in atmospheric pressure in terms of inches of mercury and altitude by the plotted line A. The scheduled preformance of the aircraft is defined by an upper line which constitutes a portion A' representing the period of performance of the air regulating valve prior to the time the altitude is reached, at which time the scheduled opening of the isobaric poppet valve 142 will be affected by the distended isobaric bellows 156. The period during which the isobaric bellows 156 is in control is indicated by the plotted line portion B. While the isobaric bellows is in control of the air control stream from the cabin to the pressure chamber 52 air pressure will be increased within the pressure control chamber 52 and will be exerted against the inner face of the diaphragm 31 tending to move the diaphragm 31 toward its seat 36. Attention is directed to the fact that the regulating valve here shown does not function to completely close the inflow throat 33 at any time after the aircraft is in flight. The regulating valve with which the present invention is concerned is designed so that the effective throat opening through which air may flow from the cabin to the ambient atmosphere will be changed as the valve diaphragm 31 flexes to different positions as influenced by the opposing air forces upon opposite sides of it, and as determined by the rate of control air passing through the poppet valves. During the period when the isobaric bellows 156 is in control of the controlled air stream from the cabin to the pressure chamber 52 the isobaric bellows will cause the diaphragm 31 to be maintained at a desired position. At the same time it will be obvious that the degree of distension of the isobaric bellows 156 will determine the degree of opening of the poppet valve 142. This regulation of the poppet valve 142 in turn controls the pressure relation across the valve diaphragm 31 in such a manner as to position the diaphragm appropriately to maintain a constant absolute pressure in the cabin regardless of rate of airflow. This condition will prevail at all times when the flow of cabin air through the regulating valve 10 to the ambient atmosphere is sufficient to be a controlled flow and is not greater than the capacity of the regulator.

As the aircraft continues to climb the pressure of air within the cabin during the period represented by the graph lines B will remain a constant pressure. Eventually, however, the pressure differential across the cabin wall and between the cabin pressure and the ambient atmospheric pressure will reach a predetermined structural limit with reference to the strength of the cabin wall. During the period of flight, as represented by the portion C of the graph line, the pressure differential control bellows 177 is exposed to an internal pressure established by ambient air pressure and an external pressure established by prevailing cabin air pressure. The ambient air pressure is established through conduit 108 extending through the cabin wall 11 and communicating with the passageway 107 leading to the passageway 105 in the combat control unit shown in Fig. 6. This air also passes through conduit 189 to passageway 188 and thence successively through passageways 187, 186 and 185, through port 183 to the interior of the bellows 177. It will be understood that the pressure differential control bellows 177 has been adjusted axially so that as the bellows contracts with increasing pressure differential, the differential poppet valve 173 will reach a controlling position at a predetermined safe pressure differential. This condition could occur, for example, at an airplane altitude of 25,000 feet. With continued increase of airplane altitude above this altitude the pressure differential poppet valve 173 will be in control and the cabin altitude will increase. As the cabin altitude increases the isobaric bellows 156 will expand, pushing the isobaric poppet valve 142 completely out of control. By this arrangement, due to the differential force exerted by pressure of ambient air within the pressure differential control bellows 177 and cabin air on the outside of pressure differential control bellows 177, the absolute cabin pressure is decreased in proportion to the altitude gained by the aircraft. Thus, the differential pressure, as indicated at X in the graph, will remain constant for all altitudes so long as the aircraft has attained an altitude in the range indicated by the line C of the graph.

When the airplane descends the regulating valve will remain in its set position until an altitude has been reached at which the isobaric control bellows 156 has contracted to a position where the isobaric poppet valve 142 assumes control of the control air-flow. Then the pressure differential bellows 177 will expand until it moves the differential poppet valve 173 to an out-of-control position. Thus, the valve will perform as indicated in the graph in Fig. 9 along the line C, B and A' until the plane lands. It is to be understood that the combat valve may be placed in operation and will act as previously described.

It will thus be seen that the method and means of regulating air pressure within a cabin of aircraft, as here disclosed, is simple and compact in construction, and is motivated and controlled solely by the variation in pressure occurring between the cabin air and the ambient atmosphere.

While I have shown my preferred method and apparatus for practising the same, it is to be understood that variation may be made in the steps of the method as well as changes in the combination, construction and arrangement of the parts of the apparatus by those skilled in the art without departing from the spirit of the invention as claimed.

Having thus described my invention, what I claim and desire to secure by Letters Patent is:

1. In a control system for a supercharged aircraft cabin having an air outlet, a cabin pressure regulating valve mounted over said outlet, said valve comprising a throat structure circumscribing the air inlet and extending inwardly therefrom, an annular valve face at the inner end of said throat, a ported valve bowl associated with the inner end of said throat, a valve diaphragm supported from said bowl at its circumferential edge and extending across the throat opening, said diaphragm and bowl having an outside diameter substantially greater than the annular valve face whereby cabin air pressure may be exerted directly against a circumferential outer area of the outer face of the diaphragm and ambient atmospheric pressure may be exerted against the central area of the outer face of the diaphragm as defined by the annular valve face and toward and away from which the diaphragm flexes, a valve frame to which said throat structure is secured, a pressure chamber formed between the inner face of the diaphragm and the valve frame, a fixed area bleed outlet from said pressure chamber to ambient atmosphere, a control air duct leading from the pressure chamber to the interior of the cabin whereby a control air stream may flow from the cabin to said pressure chamber, a control valve interposed at a point in the length of said duct for varying the effective opening therethrough, and an isobaric fluid pressure sensing device of the aneroid type associated with said valve and subjected to cabin air pressure, whereby the combined pressures of the control air within the pressure chamber acting against the inner face of the diaphragm and the direct cabin air pressure and direct ambient atmospheric pressure against their respective areas of the outer face of said diaphragm will act to establish equilibrium of the diaphragm and set it with relation to the valve face to provide an outlet area from the cabin to ambient atmosphere as required to maintain the cabin pressure at a desired absolute value.

2. The structure of claim 1 including a second valve disposed in the length of the control air duct, air pressure differential sensing means associated therewith to move the same, said sensing means being subjected to the opposed pressures of cabin air and ambient atmosphere whereby the valve diaphragm will be maintained in equilibrium at the orifice opening required to allow a flow of cabin discharge air necessary to maintain a prescribed cabin pressure differential.

3. The structure of claim 1 including a second valve disposed in the length of the control air duct, air pressure differential sensing means associated therewith to move the same, said sensing means being subjected to the opposed pressures of cabin air and ambient atmosphere whereby the valve diaphragm will be maintained in equilibrium at the orifice opening required to allow a flow of cabin discharge air necessary to maintain a prescribed cabin pressure differential, and an overriding pressure ratio sensing device subjected to opposed cabin air pressure and ambient atmospheric pressure whereby a predetermined pressure ratio will be established between cabin air pressure and ambient atmospheric pressure.

4. The structure of claim 1 including means carried by the outer face of the diaphragm and cooperating with the annular valve face whereby turbulence will be created in the outflow stream of cabin air as it passes between the outer surface of the diaphragm and the contiguous annular valve face of the throat to maintain a substantially uniform air-flow condition.

5. In a control system for a supercharged aircraft cabin having an air outlet, a pressure regulating valve to control the outlet flow of cabin air, said valve comprising a tubular throat circumscribing the outlet opening and extending into the cabin, an enlarged bowl portion at the inner end of said throat, mounting means at the lip of said bowl for receiving the circumferential edge of a flexible valve diaphragm, the circumference of said mounting means being materially greater than the diameter of the throat, a flexible valve diaphragm held at its circumferential edge by said mounting means and disposed across the throat opening in an outwardly convexed position, with ambient pressure applied to the central area of the outer side thereof, an annular valve face formed at the juncture of the throat and the bowl and toward and away from which face the diaphragm may flex, ports through the wall of the bowl structure between said annular valve face and the marginal mounting for the diaphragm, said ports accommodating outflow air from the cabin and whereby cabin air pressure is exerted against a circumscribing area of the outer surface of the diaphragm, a valve frame carried at the inner end of the bowl portion and combining with the concaved inner face of the valve diaphragm to provide a pressure chamber, a constant area outflow vent leading from said pressure chamber to ambient atmosphere, a control air stream duct establishing communication between the pressure chamber and the cabin whereby cabin air may flow constantly into the pressure chamber and be vented constantly therefrom, a normally closed isobaric pressure valve interposed in said duct for controlling the flow of air from the cabin to the pressure chamber and establishing air pressure therein, and air pressure sensing means of the aneroid type associated with said valve and subjected to cabin air pressure whereby the combined air pressure of the air within the pressure chamber exerted against the inner face of the diaphragm and the direct air pressure of cabin air and ambient atmosphere exerted against the outer face of said diaphragm will tend to maintain the diaphragm in a condition of equilibrium and at a set position with relation to the annular valve face to establish an orifice opening as required to discharge an amount of air necessary to maintain the cabin air pressure at a desired absolute value.

6. The structure of claim 5 including a normally open pressure differential valve disposed in said duct to regulate the flow of air from the cabin to the pressure chamber, air pressure differential sensing means associated with said pressure differential valve and acting between cabin air pressure and ambient atmospheric pressure whereby the normally opened pressure differential valve will tend to close when a predetermined pressure differential has been reached, and will maintain a selected pressure differential between cabin air pressure and ambient atmospheric pressure.

7. The structure of claim 5 including a normally open pressure differential valve disposed in said duct to regulate the flow of air from the cabin to the pressure chamber, air pressure differential sensing means associated with said pressure differential valve and acting between cabin air pressure and ambient atmospheric pressure whereby the normally opened pressure differential valve will tend to close when a predetermined pressure differential has been reached and will maintain a selected pressure differential between cabin air pressure and ambient atmospheric pressure, and means cooperating between the inner face of the annular valve face and the contiguous outer surface of the diaphragm whereby the cabin air passing between the diaphragm and the valve face will be given a turbulent action.

8. In a control system for a supercharged aircraft cabin having an air outlet, a cabin pressure regulating valve comprising a throat structure, the outer end of which agrees in diameter with the outlet opening and circumscribes the same, the inner end extending into the cabin and progressively increasing in diameter towards its inner end to form a bowl portion, a valve frame carried upon the inner face of said bowl portion, a flexible valve diaphragm positioned across the mouth of said bowl and said throat and being convexed outwardly, a duct and a fixed orifice device for transmitting atmospheric pressure to the back face of the diaphragm, an annular valve face at the juncture of the throat and the bowl whereby a central diaphragm area as defined by said face will be disposed across the throat and subjected to ambient pressure, and a concentric circumscribing valve area will be disposed around the valve face and outwardly thereof to the lip of the bowl, ports formed through the wall of the bowl portion and communicating with the cabin whereby the pressure of cabin air will be directly applied to said concentric circumscribing diaphragm portion, and a pressure chamber formed between the valve frame and the back face of the flexible diaphragm and communicating with cabin air whereby the valve diaphragm will be placed in equilibrium between the counter pressures of the air within said pressure chamber and the combined pressures of cabin and atmospheric pressure on the opposite side of the diaphragm, said equilibrium acting to set the diaphragm with relation to the annular valve seat for an existing cabin air discharge flow.

9. In a control system for a supercharged aircraft cabin having an air outlet, a pressure regulating valve structure to control the outlet flow of cabin air, said valve structure including a housing having an outlet conduit leading to said outlet opening, a flexible diaphragm disposed across the inner end of said outlet conduit to cooperate with said inner conduit end to provide a variable outlet opening, said diaphragm being of materially greater diameter than the inner diameter of the outlet conduit, a seat within the housing for engaging the circumferential edge of said diaphragm and holding it across the inner end of the conduit and with its center coincident with the axis of the outlet conduit, ports through the housing and around the outlet conduit whereby cabin air pressure may be exerted against the outer surface of the diaphragm occurring around the outlet conduit, a fluid pressure chamber formed within the housing and between a wall of the housing and the inner face of the diaphragm, a conduit provided to conduct a controlled stream of air from the cabin into said pressure chamber, a fixed area vent from said pressure chamber to ambient atmosphere, the diameters of the inner end of the outlet conduit and the diaphragm seat being so proportioned as to provide a central area of the outer face of the diaphragm exposed to ambient air pressure through the outlet conduit and a circumscribing area of the outer face of the diaphragm as it occurs between the inner end of the outlet conduit and the diaphragm mounting exposed to direct cabin air pressure, said central and circumscribing outer areas being proportioned to require a pressure within the pressure chamber and exerted against the inner face of the diaphragm of a value midway between the cabin air pressure exerted against the circumscribing outer face of the diaphragm and the ambient atmospheric pressure exerted against the central area of the outer face of the diaphragm when the diaphragm is in equilibrium to insure that the pressure differential from the cabin chamber to said intermediate diaphragm pressure will be equal to the pressure differential existing from the intermediate diaphragm pressure and the ambient atmospheric pressure when the diaphragm is in equilibrium.

10. The structure of claim 9 including guide means for maintaining the valve in operation axially centered and normal to the axis of the outlet conduit.

11. The structure of claim 9 including guide means for maintaining the valve in operation axially centered and normal to the axis of the outlet conduit, and means cooperating between the inner edge of the outlet conduit and the contiguous area of the outer face of the diaphragm acting to modify the airflow passing from the cabin to the outlet conduit between the inner edge of the outlet opening and said contiguous diaphragm area to prevent material change in air pressure distribution on the outer face of the diaphragm.

12. The structure of claim 9 including guide means for maintaining the valve in operation axially centered and normal to the axis of the outlet conduit, means cooperating between the inner edge of the outlet conduit and the contiguous area of the outer face of the diaphragm acting to modify the airflow passing from the cabin to the outlet conduit between the inner edge of the outlet opening and said contiguous diaphragm area to prevent material change in air pressure distribution on the outer face of the diaphragm, a valve disposed within the control air stream from the cabin to the pressure chamber, and a sensing device associated therewith and subjected to opposed cabin air pressure and ambient atmospheric pressure to set the valve in a desired control position.

13. In a control system for a supercharged aircraft cabin having an air outlet, a variable orifice pressure regulating valve structure to control the outlet flow of cabin air, said valve structure including a valve frame, an outlet throat secured thereto and comprising a relatively large bowl section and a central outlet conduit of reduced diameter, a circular valve lip formed at the juncture of the bowl and the outlet conduit section, ports through the wall of the throat structure between said lip and the outer marginal edge of the bowl, said ports communicating with the interior of an aircraft cabin and said outlet conduit communicating with ambient atmosphere, a diaphragm mounted and hermetically sealed along the outer marginal edge of the bowl, said marginal edge being in a plane normal to and concentric with the axis of said outlet conduit, the diaphragm being convexed toward the circular lip at the inner edge of the outlet conduit to flex toward and away from said valve lip, the central area of the diaphragm being relatively stiff and subjected on the outer side thereof to ambient pressure, the area of said outer side circumscribing said central area being subjected to cabin pressure, a guide member carried at the center of said area and disposed axially of the throat, guide means in the throat for receiving said guide member to maintain the flexible diaphragm in axial alignment, a pressure chamber formed between the concaved rear face of the diaphragm and the valve frame, a constant area vent opening from said chamber to ambient atmosphere, a flow tube through which a control air stream may be delivered to said pressure chamber from within the cabin, a normally open valve interposed at a point in said flow stream, and a differential pressure bellows operatively associated with said valve and responding to pressure difference between ambient atmospheric pressure and cabin air pressure whereby said control valve will move toward a controlled position to place the diaphragm in equilibrium and establish an orifice opening as required to permit discharge of air from the cabin in an amount necessary to maintain cabin air pressure at a desired absolute value.

14. The structure of claim 13 including a second control valve interposed in said control air stream, said valve being normally closed, and an isobaric pressure bellows associated with said second named valve and being subjected to cabin air pressure whereby said valve will be moved to appropriate open control positions.

15. In a control system for a supercharged aircraft cabin having an air outlet, a variable orifice pressure regulating valve to control the outlet flow of cabin air, said valve including a valve frame, an outlet structure associated therewith comprising a bowl and a central outlet passageway formed as a continuation of the bowl and being of relatively lesser diameter, a valve face occurring at the juncture of the inner end of said passageway and the bowl, ports through the wall of the bowl between its outer edge and said valve face and communicating with the cabin, the outer end of said outlet passageway extending through the opening in the cabin wall and communicating with ambient atmosphere, a circular flexible diaphragm hermetically sealed along the marginal edge of the mouth of the bowl section whereby the diaphragm will be disposed across the bowl and across the outlet passageway, said diaphragm being convexed outwardly so that it will flex toward and away from the valve face, a pressure chamber being formed between the valve frame and the rear concaved face of the valve diaphragm, a control air stream conduit establishing communication between said pressure chamber and the interior of the cabin to create an air pressure condition within said pressure chamber, a constant area air vent from said pressure chamber to ambient atmosphere thereby causing cabin air pressure to be exerted against the inner face of the flexible diaphragm while ambient atmospheric pressure will be exerted against the center area of the outer face of the diaphragm and cabin air pressure will be exerted against the circumscribing concentric area of the outer face of the diaphragm to create pressures acting to maintain the diaphragm in equilibrium and at a position relative to the valve face to establish an orifice opening between the valve face and the outer face of the diaphragm as required for the discharge of an amount of air from the cabin to maintain the cabin at a desired absolute pressure, the outer concentric area being approximately twice that of the center area, and means associated with said control air conduit and responding to pressure difference between ambient and atmospheric air pressures to vary the air pressure existing within the pressure chamber.

16. In a control system for a supercharged aircraft cabin having an air outlet, a variable orifice pressure regulating valve to control the outlet flow of cabin air, said valve including a valve frame, an outlet structure associated therewith comprising a bowl and a central outlet passageway formed as a continuation of the bowl and being of relatively lesser diameter, a valve face occurring at the juncture of the inner end of said passageway and the bowl, ports through the wall of the bowl between its outer edge and said valve face and communicating with the cabin, the outer end of the said outlet passageway extending through the opening in the cabin wall and communicating with ambient atmosphere, a circular flexible diaphragm hermetically sealed along the marginal edge of the mouth of the bowl section whereby the diaphragm will be disposed across the bowl and across the outlet passageway with the central area of its outer side subjected to ambient pressure and with the area of said outer side circumscribing said central area being subjected to cabin pressure through said ports, said diaphragm being convexed outwardly so that it will flex toward and away from the valve surface, a pressure chamber being formed between the valve frame and the inner concaved face of the valve diaphragm, a constant area vent from the pressure chamber to ambient atmosphere, a control air stream conduit delivering air under cabin pressure to said pressure chamber, a valve structure interposed at a point in the length of said conduit to vary the volume of control air passing from the cabin to the pressure chamber, fluid pressure responsive means associated with said valve to open and close the same, a housing within which said fluid pressure responsive means is sealed, and optionally controlled means for introducing cabin air or ambient atmosphere in said housing whereby when said fluid pressure responsive means is subjected to ambient atmospheric pressure said means will control the pressure ratio existing between cabin and ambient pressures to a prescribed value.

17. In a control system for a supercharged aircraft cabin having an air outlet, a variable orifice pressure regulating valve to control the outlet flow of cabin air, said valve including a valve frame, an outlet structure associated therewith comprising a bowl and a central outlet passageway formed as a continuation of the bowl and being of relatively lesser diameter, a valve face occurring at the juncture of the inner end of said passageway and the bowl, ports through the wall of the bowl between its outer edge and said valve face and communicating with the cabin, the outer end of said outlet passageway extending through the opening in the cabin wall and communicating with ambient atmosphere, a circular flexible diaphragm hermetically sealed along the marginal edge of the mouth of the bowl section whereby the diaphragm will be disposed across the bowl and across the outlet passageway with the central area of its outer side exposed to ambient pressure in said outlet passageway and the area of said outer side circumscribing said central area being subjected to cabin pressure through said ports, said diaphragm being convexed outwardly so that it will flex toward and away from the valve surface, a pressure chamber being formed between the valve frame and the rear concaved face of the valve diaphragm, a constant area vent from the pressure chamber to ambient atmosphere, a control air stream conduit delivering air under cabin pressure to said pressure chamber, a valve structure interposed at a point in the length of said conduit to vary the volume of control air passing from the cabin to the pressure chamber, and fluid pressure responsive means associated with said valve to open and close the same, said means including a pressure differential bellows and an aneroid bellows mechanically in series connected and interposed between a fixed abutment and the valve whereby the collective action of the two bellows will be directed to operate the valve to control the cabin pressure with respect to ambient pressure to a prescribed pressure ratio.

18. In a control system for a supercharged aircraft cabin having an air outlet, a variable orifice pressure regulating valve to control the outlet flow of cabin air, said valve including a valve frame, an outlet structure associated therewith comprising a bowl and a central outlet passageway formed as a continuation of the bowl and being of relatively lesser diameter, a valve face occurring at the juncture of the inner end of said passageway and the bowl, ports through the wall of the bowl between its outer edge and said valve face and communicating with the cabin, the outer end of said outlet passageway extending through the opening in the cabin wall and communicating with ambient atmosphere, a circular flexible diaphragm hermetically sealed along the marginal edge of the mouth of the bowl section whereby the diaphragm will be disposed across the bowl and across the outlet passageway with the central area of its outer side exposed to ambient pressure in said outlet passageway and the area of said outer side circumscribing said central area being subjected to cabin pressure through said ports, said diaphragm being convexed outwardly so that it will flex toward and away from the valve surface, a pressure chamber being formed between the valve frame and the rear concaved face of the valve diaphragm, a constant area vent from the pressure chamber to ambient atmosphere, a control air stream conduit delivering air under cabin pressure to said pressure chamber, a valve structure interposed at a point in the length of said conduit to vary the volume of control air passing from the cabin to the pressure chamber, fluid pressure responsive means associated with said valve to open and close the same, same means including a pressure differential bellows and an aneroid bellows mechanically connected and interposed between a fixed abutment and the valve whereby the collective action of the two bellows will be directed to operate the valve, a housing within which said fluid pressure responsive means is sealed, and optionally controlled means for introducing cabin air or ambient atmosphere into said housing to select either pressure differential or pressure ratio schedules.

19. In a control system for a supercharged airdraft cabin having an air outlet, a variable orifice pressure regulating valve to control the outlet flow of cabin air, said valve including a valve frame, an outlet structure associated therewith comprising a bowl and a central outlet passageway formed as a continuation of the bowl and being of relatively lesser diameter, a valve face occurring at the juncture of the inner end of said passageway and the bowl, ports through the wall of the bowl between its outer edge and said valve face and communicating with the cabin, the outer end of said outlet passageway extending through the opening in the cabin wall and communicating with ambient atmosphere, a circular flexible diaphragm hermetically sealed along the marginal edge of the mouth of the bowl section whereby the diaphragm will be disposed across the bowl and across the outlet passageway with the central area of its outer side exposed to ambient pressure in said outlet passageway and the area of said outer side circumscribing said central area being subjected to cabin pressure through said ports, said diaphragm being convexed outwardly so that it will flex toward and away from the valve surface, a pressure chamber being formed between the valve frame and the rear concaved face of the valve diaphragm, a control air conduit formed in said valve frame and establishing communication between the pressure chamber and the cabin whereby a stream of cabin air may flow into the pressure chamber, a differential pressure valve seat and an isobaric pressure valve seat disposed at points along said conduit with the isobaric pressure valve seat being between the induction end of said conduit and said differential pressure valve seat, poppet valves, one for each of said valve seats, yieldable means tending to urge both of said poppet valves toward their closed positions and in a counterdirection to the flow of air through the conduit, an isobaric fluid pressure bellows associated with the poppet valve of the isobaric valve seat, said bellows being set to allow the poppet valve to seat when in its initial position and to move away from said seat when the bellows expands, said bellows being of the aneroid type and being subjected exteriorly to cabin air pressure, a pressure differential bellows associated with the valve of the pressure differential valve seat, the interior of said bellows being exposed to ambient air pressure and the exterior of said bellows being exposed to cabin air pressure, said pressure differential bellows being mounted to hold the pressure differential poppet valve away from its seat normally and to move toward its seat as ambient air pressure reduces with relation to cabin air pressure, and adjusting means for determining the conditions under which the control of the air control stream passing through the conduit will be affected by the isobaric poppet valve and when it will be affected by the pressure differential poppet valve.

20. In a cabin control system for a supercharged aircraft cabin having an air outlet, a cabin pressure regulating valve mounted over said outlet, said valve including a valve housing formed with an outlet passageway in communication with the air outlet from the cabin to ambient atmosphere, a valve face circumscribing the inner end of said outlet passageway, valve ports in a portion of the valve housing circumscribing the valve seat and through which air may pass directly from the cabin across the seat and through the outlet passageway, a valve member mounted within said housing and disposed in central axial alignment with the passageway, said member moving toward and away from the valve face to vary the effective opening between the cabin and the outlet passageway and being of a diameter materially greater than the diameter of the valve face whereby a central area of the outer face of said valve member will be subjected to ambient air pressure and a circumscribing area of the valve face will be subjected to cabin air pressure, a chamber within the housing to receive air from the cabin and within which chamber said cabin air creates a pressure which is applied to the back of the valve member and in opposition to ambient and cabin air pressures, a duct through which cabin air flows to said pressure chamber, a valve in said duct to vary the flow of cabin air and thus to vary the pressure of air within said pressure chamber, a constant orifice outlet from said pressure chamber to ambient atmosphere, and isobaric sensing means associated with said control valve for actuating the same in response to cabin absolute pressure whereby an air pressure may be established within the pressure chamber and in opposition to the ambient and cabin air pressure exerted against the outer face of the valve member to place the valve in equilibrium and to discharge an amount of air from the cabin necessary to maintain the cabin air pressure at a desired absolute value.

21. The structure of claim 20 including a second valve disposed in the length of the control air duct, air pressure differential sensing means associated therewith to move the same, said sensing means being subjected to the opposed pressures of cabin air and ambient atmosphere whereby the valve diaphragm will be maintained in equilibrium at the orifice opening required to allow a flow of cabin discharge air necessary to maintain a prescribed cabin pressure schedule.

22. The structure of claim 20 including a second valve disposed in the length of the control air duct, air pressure differential sensing means associated therewith to move the same, said sensing means being subjected to the opposed pressures of cabin air and ambient atmosphere whereby the valve diaphragm will be maintained in equilibrium at the orifice opening required to allow a flow of cabin discharge air necessary to maintain a prescribed cabin pressure schedule, and an overriding pressure ratio sensing device subjected to opposed cabin air pressure and ambient atmospheric pressure whereby a predetermined pressure ratio will be established between cabin air pressure and ambient atmospheric pressure.

23. In an aircraft cabin pressure regulator, means defining an outlet for substantially continuing discharge of air from the cabin to atmosphere, and a valve seat adjacent said outlet; a diaphragm; a housing to which the periphery of said diaphragm is secured, said housing cooperating with said diaphragm to define a control chamber in which air pressure may act on said diaphragm in valve closing direction; said diaphragm having a central portion constituting a vent valve cooperating with said seat to regulate outflow of cabin air through said outlet and subjected on its outer side to atmospheric pressure; and means for providing a substantially continuing modulated flow of air from the cabin to atmosphere through said control chamber so as to control the operation of said diaphragm with a modulating action, said last means including a bellows responsive at least partially to changes in cabin pressure, and a pilot valve operated by said bellows; said diaphragm being so related to said valve seat as to have a portion circumscribing said central portion and subjected to cabin pressure in valve opening direction, the actual area of said circumscribing portion being greater than that of said central portion by a ratio such that the effective pressure responsive areas of said central and circumscribing portions are substantially equal, whereby the pressure in said control chamber will normally have a value substantially at the midpoint between cabin and atmospheric pressures.

24. A regulator as defined in claim 23, wherein said bellows is an isobaric bellows responsive to changes in cabin pressure to maintain cabin pressure at a substantially fixed predetermined value in at least one stage of operation of the regulator.

25. A regulator as defined in claim 24, wherein said bellows is responsive to changes in the differential between cabin and ambient pressure, for maintaining said differential at a substantially fixed predetermined value in at least one stage of operation of the regulator.

26. A regulator as defined in claim 23, including two pilot valves, an isobaric bellows, responsive to changes in cabin pressure for operating one of said pilot valves, and a bellows responsive to changes in the differential between cabin and atmospheric pressure, for operating the other of said pilot valves.

27. A regulator as defined in claim 23, including three pilot valves arranged in series on the inlet side of said control chamber, and three bellows, one responsive to changes in cabin pressure, another responsive to changes in the differential between cabin pressure and atmospheric pressure, and the other responsive to changes in the ratio between cabin pressure and atmospheric pressure, for actuating the respective pilot valves.

28. In an aircraft cabin pressure regulator, means defining an outlet for the continuing discharge of air from the cabin to atmosphere and a valve seat adjacent said outlet; a diaphragm, a housing to the periphery of which said diaphragm is secured, with the central portion of said diaphragm traversing said valve seat and functioning as a valve cooperable with said seat to control outflow of air from the cabin through said outlet, said housing cooperating with one side of said diaphragm to define a control chamber in which air pressure may act on said diaphragm in valve closing direction; a bellows responsive at least partially to changes in cabin pressure; and means for providing a continuing modulated flow of air from the cabin to atmosphere through said control chamber for modulating the pressure therein so as to control the operation of said diaphragm, said last means including a passage for flow of air from the cabin into the control chamber, a passage for flow of air from the control chamber to atmosphere, and a pilot valve, actuated by said bellows, in one of said passages, the other passage providing a constant area restricted air leak orifice balanced against said pilot valve; said diaphragm being related to said valve seat so as to have on its other side a circumscribing portion around said seat, of greater actual area than that of the central portion thereof within said seat, by a ratio such that said central and circumscribing portions will have substantially equal effective areas of pressure responsiveness; said effective areas being subjected respectively to cabin and atmospheric pressures both acting in valve opening direction and balanced against the pressure in said control chamber when the regulator is passing air; whereby the pressure in said control chamber will be substantially the midpoint in the pressure drop from the cabin to atmosphere.

29. A regulator as defined in claim 28, wherein said central diaphragm area is subjected to atmospheric pressure in said outlet and said peripheral area is subjected to cabin pressure.

30. A regulator as defined in claim 28, wherein said constant area leak orifice is on the outlet side of the control chamber, and said pilot valve is on the inlet side of the control chamber, and is arranged to open in the direction of flow therethrough.

31. In an aircraft cabin pressure control valve, means defining an outlet for discharge of air from the cabin to atmosphere, and a valve seat adjacent said outlet; a diaphragm; a housing to which the periphery of said diaphragm is secured, said housing cooperating with said diaphragm to define a control chamber in which air pressure may act on the inner surface of said diaphragm; the central portion of said diaphragm constituting a vent valve cooperable with said seat to regulate outflow of air through said outlet; a bellows responsive to changes in the differential of cabin pressure over atmospheric pressure; and means including a pilot valve actuated by said bellows for providing a flow of air from the cabin into said control chamber, so as to control the operation of said vent valve to maintain said differential substantially fixed at a predetermined value; said central portion and the portion of the diaphragm circumscribing the same, having respective outer surfaces one of which is subjected to cabin pressure and the other of which is subjected to atmospheric pressure, said outer surfaces being so proportioned as to have substantially equal effective areas of pressure responsiveness, whereby the pressure in said control chamber will be substantially the midpoint in the pressure drop from cabin pressure to atmosphere through said control chamber.

32. In an aircraft cabin pressure control valve, means defining an outlet for discharge of air from the cabin to atmosphere, and a valve seat adjacent said outlet; a vent valve cooperable with said seat to regulate outflow of cabin air through said outlet; a pneumatic servomotor member connected to said valve for operating the same; a housing cooperating with one side of said servomotor member to define a control chamber in which air pressure may act thereon to move said valve; a bellows responsive at least partially to changes in cabin pressure; and means including passages from the cabin to said control chamber and from said control chamber to atmosphere, and a pilot valve actuated by said bellows and controlling the flow in one of said passages, for providing a flow of air from the cabin to atmosphere through said control chamber, the other of said passages constituting a fixed bleed the other side of said servomotor member having an area which is so proportioned to the area of said valve defined within said valve seat, that both said areas will have approximately the same effective area of pressure responsiveness; one of said areas being arranged in communication with said outlet so as to be subjected to atmospheric pressure and the other of said areas being arranged in communication with the cabin so as to be subjected to cabin pressure, whereby the pressure in said control chamber will be substantially the midpoint in the pressure drop from cabin pressure to atmosphere through said control chamber.

33. In an aircraft cabin pressure control valve, means defining an outlet for discharge of air from the cabin to atmosphere, and a valve seat adjacent said outlet; a diaphragm; a housing to which the periphery of said diaphragm is secured, said housing cooperating with said diaphragm to define a control chamber in which air pressure may act on one side of said diaphragm; the central portion of said diaphragm constituting a vent valve cooperable with said seat to regulate outflow of air through said outlet; a bellows responsive to changes in the differential of cabin pressure over atmospheric pressure; and means including a pilot valve actuated by said bellows for providing a flow of air from the cabin into said control chamber, so as to control the operation of said vent valve to maintain said differential substantially fixed at a predetermined value; said central portion and the portion of the diaphragm circumscribing the same, having their respective surfaces on the other side of the diaphragm subjected respectively to cabin pressure and atmospheric pressure, said respective surfaces being so proportioned as to have substantially equal effective areas of pressure responsiveness, whereby the pressure in said control chamber will be substantially the midpoint in the pressure drop from cabin pressure to atmosphere through said control chamber.

RUDOLPH E. KRUEGER.

REFERENCES CITED

The following references are of record in the file of this patent:

UNITED STATES PATENTS

| Number | Name | Date |
|---|---|---|
| 2,224,394 | Jurs | Dec. 10, 1940 |
| 2,393,343 | Schroeder | Jan. 22, 1946 |
| 2,399,326 | Crot | Apr. 30, 1946 |
| 2,413,027 | Maxson | Dec. 24, 1946 |
| 2,424,491 | Morris | July 22, 1947 |
| 2,433,206 | Dube | Dec. 23, 1947 |
| 2,436,183 | Snedecor | Feb. 17, 1948 |
| 2,441,088 | Teague | May 4, 1948 |
| 2,441,592 | Paget | May 18, 1948 |
| 2,463,487 | Widgery et al. | Mar. 1, 1949 |
| 2,463,491 | Kemper | Mar. 1, 1949 |